J. T. GILMER.
SAP OR GUM EXTRACTOR.
APPLICATION FILED AUG. 6, 1909.
961,953. Patented June 21, 1910.
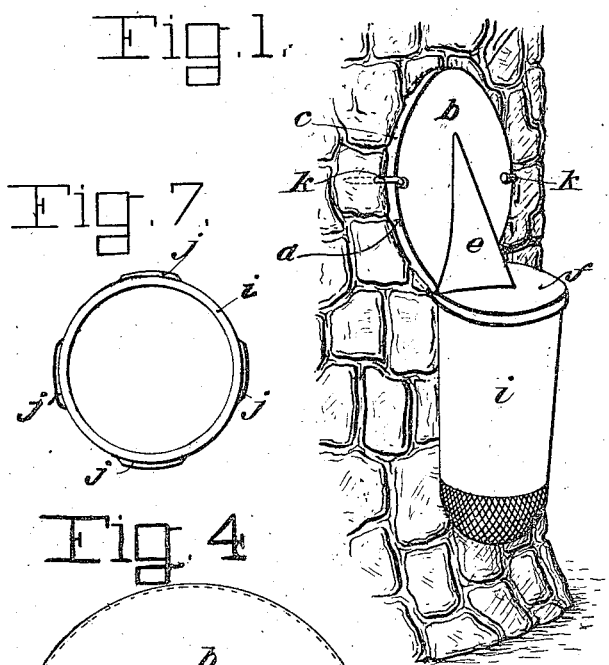
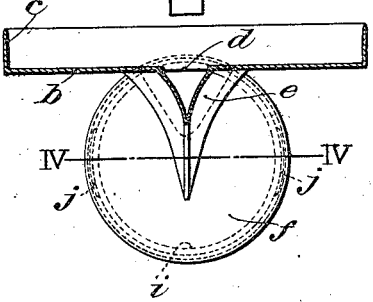
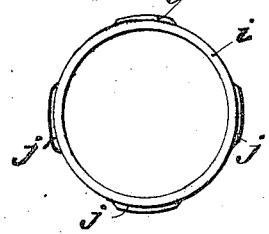
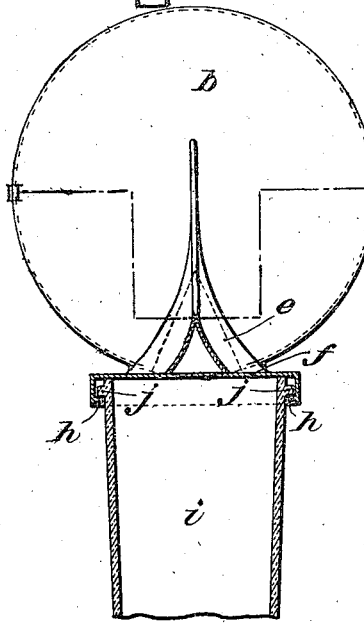
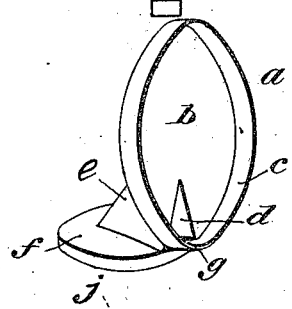
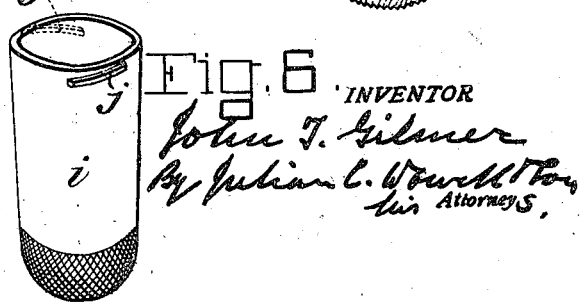
WITNESSES
Harry King
Joseph C. Stack
INVENTOR
John T. Gilmer
By Julian C. Wewell
his Attorneys

UNITED STATES PATENT OFFICE.

JOHN T. GILMER, OF FLORALA, ALABAMA.

SAP OR GUM EXTRACTOR.

961,953.                 Specification of Letters Patent.    Patented June 21, 1910.

Application filed August 6, 1909. Serial No. 511,619.

*To all whom it may concern:*

Be it known that I, JOHN T. GILMER, a citizen of the United States, residing at Florala, in the county of Covington and State of Alabama, have invented certain new and useful Improvements in Sap or Gum Extractors; and I do hereby declare the following to be a full, clear, and exact description of the invention, such as will enable others skilled in the art to which it appertains to make and use the same.

This invention relates to devices for use in extracting sap or gum from pine and other gummiferous trees, including maple and rubber, but more especially for collecting gum from pine trees for the production of rosin and turpentine.

The invention refers more particularly to that kind of sap or gum extractor having a cap adapted for fastening over a tap hole and provided with a cover for a depending vessel into which the sap or gum exuding from the tap hole is discharged through a passage from said cap.

The employment of this kind of extractor or collector avoids the scarification of the trees incident to the former method of boxing, hacking and scraping; it houses and protects the tap hole and provides for collection of the sap or gum without exposure to the air or weather, thus promoting the free flow or exudence of sap or gum by protecting the pores against congestion by cold or frost, as well as protecting it from rain, dirt and the like, while also eliminating the usual wastage due to overflow, evaporation and drying or the washing away of soft gum by rain, so that a larger quantity of gum can be recovered and of a better and purer quality.

The present invention is an improvement on the sap or gum extractor set forth and claimed in my Patent No. 907,778, dated December 29, 1908; and its objects are to simplify and improve the construction, and increase the practicability, efficiency and convenience of sap or gum extractors of the character above stated.

The invention will be first fully described with reference to the accompanying drawings, which form a part of this specification, and then more particularly pointed out in the claim at the end of the description.

In said drawings, wherein corresponding parts in the several figures are denoted by the same reference symbols: Figure 1 is a perspective view of a device embodying my invention, shown applied to a tree. Fig. 2 is an enlarged horizontal section on the line II—II of Fig. 4. Fig. 3 is an enlarged vertical section taken centrally through the collector. Fig. 4 is a vertical section on the line IV—IV of Fig. 2. Fig. 5 is perspective view of the cap and attached cover viewed from the rear. Fig. 6 is a perspective view of the sap collecting vessel provided with two ribs or lugs to provide for its attachment to the cover. Fig. 7 is a plan view of a modified form of a collecting vessel provided with four of such ribs.

In the drawings, $a$ denotes a cap adapted to be fastened as a cover over a tap hole or holes in the tree to be sapped. The cap is formed of a plate $b$, which may be circular, and which is provided with a peripheral rim or flange $c$ that extends rearwardly and is adapted to be embedded into a tree. The plate $b$ is provided with an aperture $d$ which preferably extends radially as far as the rim and provides an outlet for sap collected in the cap $a$. The aperture $d$ is in communication with a hollow member $e$ forming a conduit, preferably triangular in form, which extends from the front face of the plate $b$ forwardly and downwardly, and at its lower end carries a horizontally disposed cover $f$. The conduit $e$ may be integral with the cap and cover, if the device be cast; or if made of sheet-metal, the conduit may be formed of a sheet bent upon itself to form angularly disposed sides; and it is terminated by ends disposed at an approximate right angle to each other, the cap being connected to one end and the cover to the other in any suitable manner, such for instance as by soldering or riveting. It will be seen therefore that the conduit $e$ serves also as a bracket extending between the cap and cover.

The cover $f$ has an aperture $g$ communicating with the conduit $e$, and also a downwardly extending annular flange provided along its inner surface with lugs or ribs $h$ which are preferably in the nature of oppositely disposed segments of screw-threads. These ribs are for the purpose of securing the sap-collecting vessel $i$ to the cover. This collecting vessel is preferably of glass, and of the form shown; that is having an upper end from which it converges somewhat to the lower closed end which is rounded or convex and has its outer surface checkered or milled. To provide for its attachment to the cover, the upper exterior surface of the receptacle is provided with oppositely disposed lugs or ribs preferably in the nature of segments of screw-threads *j*. When the receptacle is to be attached to the cover the mouth of the former is inserted within the downwardly extending flange of the latter with the ribs *j* to one side of, or in advance of the ribs *h* of the cover, the receptacle is then given a turn, its ribs *j* entering between the cover and the ribs *h* engaging the latter in a screw-like manner, whereby the receptacle is attached to and has its mouth drawn tightly against the cover. The number of ribs may be as desired: in Figs. 2 and 6 two ribs have been illustrated, while in Fig. 7 four ribs are shown upon the vessel.

The device is secured to a tree by means of small malleable nails *k* which are driven into the tree by the side of the cap and are then bent over against the plate *b* of the cap.

The operation, briefly and generally stated, is as follows: In the tree to be sapped, one or more holes are bored, of such size that they will be inclosed by the rim *c* of the cap, which is applied to the tree over such tap hole with the edge of the rim *c* embedded in the bark making a substantially air-tight housing around the sap holes. The cap is retained in this position and the device attached to the tree by means of the nails *k*. The collecting vessel is then screwed to the cover; and the device is left to collect the sap or gum which exudes from the tap holes and is discharged through the conduit *e* into the receptacle. When the latter has been substantially filled, it can be easily detached by unscrewing its lugs from engagement with those of the cover. It can then be emptied and again attached to the cover, or another vessel used instead.

The bracket-like conduit *e* holds the cap and cover together, serves as a discharge passage for the sap, strengthens the entire device, and presents a surface which can be grasped by the hand when it is desired to remove the device from a tree.

The cap *a* is shallow; and the air-tight chamber it forms around the tap hole operates to prevent the cold from congesting the pores of the wood; and the screw connection of the collecting vessel to the cap enables the former to make a tight closure against the latter.

The collecting vessel being preferably of glass, it may be readily molded to the desired form without seams and with the ribs *j* formed as an integral part thereof; and by reason of its checkered lower end it can be handled easily and with safety. The glass collecting vessel provides a smoother interior than would a metal one, and, further, the amount of sap it contains can be seen without removing the vessel as would be necessary if an opaque vessel were used.

Having thus described my invention, what I claim is:

A sap or gum extractor comprising a cap formed of a substantially flat plate provided with a shallow rearwardly extending annular flange, a cover for a collecting vessel disposed at an approximate right angle to the cap and formed of a plate having a downwardly extending flange, the plate of the cover being approximately in contact with the flange of the cap, the plate of the cap having an opening through its lower portion extending approximately to its flange and the plate of the cover being provided with an opening located adjacent said opening of the cap, and a hollow member connected at one end to the cap and inclosing said opening therethrough and connected at the other end to the cover and inclosing said opening therethrough, the hollow member forming a conduit between said openings and also forming a bracket connecting the cap and cover.

In testimony whereof I affix my signature, in presence of two witnesses.

JOHN T. GILMER.

Witnesses:
  O. F. LUTTRELL,
  C. R. RANKIN.